INVENTORS
JAMES L. HANCOCK
JOSEPH A. BLISS
GEORGE F. SEAGREAVES
BY
ATTORNEY

United States Patent Office 3,210,457
Patented Oct. 5, 1965

3,210,457
MOTOR MOUNTABLE SAFETY CAPACITOR PACKAGE
James L. Hancock, Fairborn, Joseph A. Bliss, Dayton, and George F. Seagreaves, Warren, Ohio, assignors to General Motors Corporation, Detroit, Mich., a corporation of Delaware
Filed July 23, 1962, Ser. No. 211,487
19 Claims. (Cl. 174—48)

This invention relates to a safety capacitor package, and, more particularly, to a combination of flammable materials which together form a non-flammable package conveniently mountable for ready access thereto.

An object of this invention is to provide a new and improved safety capacitor package in which a foam material adheres to an outer periphery of the capacitor supported thereby in a compatible bond which fills space and seals off air supply for protection against internal arcing and fire.

Another object of this invention is to provide a safety capacitor package including a plastic main body portion and mating plastic cover portion heat sealable to each other integrally to house an electrolytically impregnated capacitor wrapped foil means having electrical tab connection thereto within housing space filled with an internal foamable, curable, expandable, immobilizing material of predetermined density sufficiently resilient to support the capacitor means regardless of mounting vibration such as motor shaking and the like as well as to fill dead air space while acting as a seal for a vent hole which operates if excess heat softens the foamable immobilizing agent, yet maintaining capacitor encapsulation in a closed cell foam system to preclude oxygen supply in a gaseous state so that an explosion possibly caused by internal arcing is obviated.

Another object of this invention is to provide a safety capacitor package including an all-plastic housing means having a cover portion integrally bonded to a recessed body portion ribbed for rigidity and including integrally annular mounting projections at longitudinally opposite ends optionally usable in lieu of a plurality of hook-like downwardly extending mounting arms that can have locking engagement established by insertion thereof into corresponding openings of straight as well as curved mounting panels to carry the package removable therefrom by displacement of locking arm engagement manually as well as by tool means such as an externally accessible screwdriver and the like.

A further object of this invention is to provide a safety capacitor package made non-flammable by a combination of flammable materials including plastic cover and body portions heat sealable integrally to each other to contain an electrolytically impregnated capacitor wrapped foil means having electrical tab connection thereto in space into which a predetermined quantity of liquid material is added to expand into plastic foam of polyurethane and the like with a non-halogenated blowing agent which can occur simultaneously with heat sealing of cover and body portions to an air vent therein and simultaneously effecting fill of internal space as well as sealing around terminal tab connection openings for cutoff of air supply to the capacitor means while the foam material per se establishes possible exhaust venting though smothering any possible flame up within the package.

Another object of this invention is to provide a motor mountable capacitor package including plastic cover and body portions heat sealable integrally to each other to be variously compatible with mountings including opposite end clip means, arcuate motor housing and flat surface plate means with the latter leaving an arcuate space for terminal lead-in conductor means to the capacitor package due to an upwardly recessed lower edge of opposite end walls of the body portion which further includes substantially J-shaped mounting arms integral with and extending downwardly for stabilized anchoring support in mounting apertures sufficiently large for engagement and disengagement of the mounting arms from one side thereof.

Further objects and advantages of the present invention will be apparent from the following description, reference being had to the accompanying drawings wherein preferred embodiments of the present invention are clearly shown.

Figure 1:
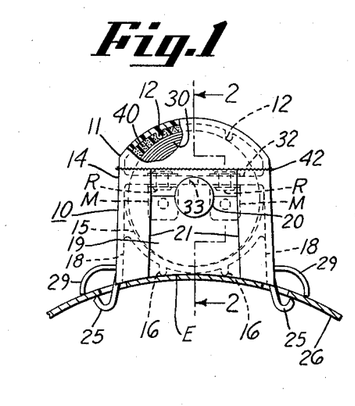
FIGURE 1 is a partially sectioned end view of a capacitor mounting structure in accordance with the present invention.

A need exists for improvement in packaging of capacitor means with a minimum of parts to be fabricated at reduced cost, yet more safe to use with variable installations. In FIGURE 1 of the drawings there is shown a safety capacitor package generally indicated by numeral 10 and having various features in accordance with the present invention that obviate possible fire damage within the capacitor package though utilizing improved venting and mounting features. This package 10 includes a curved cover portion 11 of plastic or insulating material having integral radially inwardly extending rib means 12 provided longitudinally thereof as can be seen in FIGURE 1. The cover portion 11 is adapted to complement and mate with a main body portion 14 also of insulating material molded to a predetermined shape to include a semi-arcuate bottom 15 also having integral rib means 16 extending downwardly and radially away from the bottom 15. The body portion can be seen in further detail per se in views of FIGURES 3 through 6 inclusive. Extending transversely of the rib means 16 there are web means 17 that provide a backing for downwardly extending and slightly outwardly flared sides or skirt-like extensions 18 of the body portion portion 14. The sides 18 as well as the bottom 15 of the body portion can be made of a moldable plastic material including integral opposite ends or transverse walls 19 each having integral annular mounting projections 20 extending longitudinally in opposite directions and located to have a center coinciding substantially axially of curvature of an inner surface of the bottom 15 of the body portion 14. This coaxial relationship of the projections 20 is apparent in views of FIGURES 1 and 2 of the drawings. Each of the transverse walls or opposite ends 19 of the body portion 14 can include a pair of downwardly extending and slightly outwardly projecting integral flanges 21 which enhance strength of each of the corners of the body portion 14 and which also form a recess therebetween to assure access to the projections engageable by metal mounting clip means having apertured arms 22 such as indicated in FIGURE 4 representing one of several mountings possible for the package 10 in accordance with the present invention. The arms 22 outlined in FIGURE 4 can be part of a substantially U-shaped metal bracket 23 which can be secured to a suitable mounting plate 24 also outlined in FIGURE 4. The bracket 23 per se does not form part of the present invention and reference thereto is made only for purposes of describing versatility and compatibility of the capacitor package 10 so far as mounting thereof is concerned as to differing supports, clips and the like. It is apparent in FIGURE 4 that the arms 22 can fit in the space between the flanges 21 so as to anchor the package 10 against turning, though it is to be understood that projections 20 can be provided integrally with the opposite end walls without the flanges 21 to be engageable by the arms 22 for mounting purposes.

Figures 6, 7:
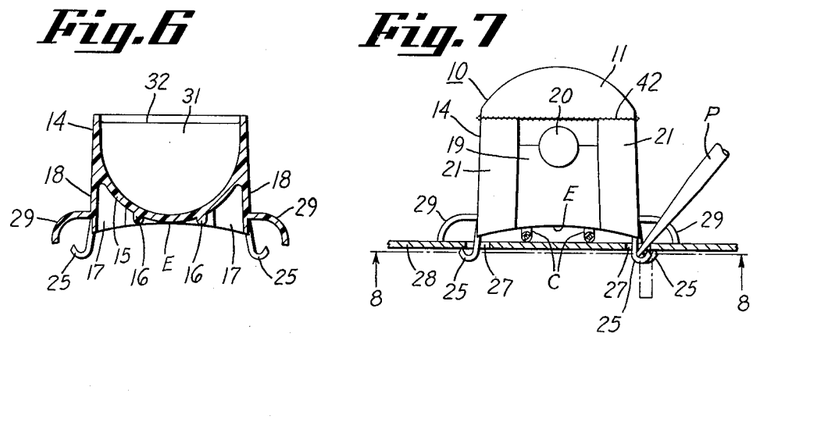
FIGURE 6 is a sectional view taken along line 6—6 in FIGURE 3.
FIGURES 7 and 8 are end and plan views, respectively, to show installation and removal of the safety capacitor package on a flat-surfaced apertured mounting plate means.

The main body portion 14 along the sides 18 thereof further includes a plurality of hook-like downwardly extending mounting arms or integral substantially J-shaped mounting lugs 25 adapted to fit through apertures of a curved mounting gate or motor housing portion 26 outlined in FIGURE 1 as well as similar apertures 27 or squared cutouts each with outward slot 27s in a flat mounting panel 28 illustrated in FIGURE 7. Extending laterally outwardly and downwardly from the sides 18 there can be a pair of stabilizing arms or intermediate projections 29 adapted to engage a side of the panels such as 26 and 28 opposite to the side engaged by the free ends of the mounting arms 25 as can be seen best in views of FIGURES 1 and 7. The free ends of the J-shaped arms 25 can be displaced either manually by application of pressure by use of fingers to squeeze the arms 25 toward each other or by use of a tool such as a screwdriver, ice pick or probe P which can project through the apertures 27 and/or slot 27s therewith in the plate 28 for example, so as to effect a prying and/or twisting of the arms 25 for disengagement thereof from the apertured panel. The apertures 27 preferably have a substantially square or rectangular configuration and a sufficient width to permit lateral shift of the free ends of the arms 25 during engagement and disengagement thereof relative to the mounting panel 28, for example. It is apparent from the views of FIGURES 1 and 7 that the arms 25 together with the stabilizing projections or laterally extending intermediate lug means 29 can permit mounting of the package 10 onto a curved or arcuate surface as well as a flat mounting panel or plate. Thus, several differing mountings can be accommodated with the same package 10 and it is to be noted that the opposite ends or transverse walls 19 have a lower recessed edge E which can complement contour of the curved mounting panel 26 such as on a dynamoelectric machine housing or which can provide an opening relative to the flat panel means such as 28. The complementary fit of the edge E recessed and curved upwardly to engage an outer peripheral surface of the curved mounting plate 26 can be seen in FIGURE 1 while the view of FIGURE 7 illustrates use of the curved lower edge to provide access space for lead-in wires or insulated conductors C visible in FIGURE 2 also. Each of the insulated wires or conductors C can have a female terminal means or other suitable electrical connection secured to an end thereof and such female terminal means F can be seen in the view of FIGURE 2. This female terminal means F can have structure in accordance with a Patent 2,682,038—Johnson belonging to the assignee of the present invention and adapted to mate with male connector blades in accordance with disclosures of Patents 2,989,723—Hopkins et al. and 2,989,724 Woofter also belonging to the assignee of the present invention.

Figure 2:
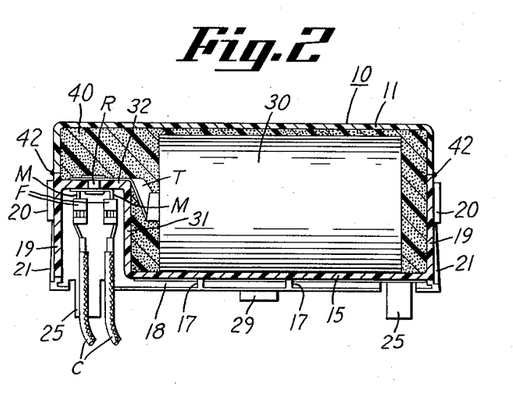
FIGURE 2 is a sectional view taken along line 2—2 in FIGURE 1.

Rivet means R outlined in FIGURE 1 and shown in FIGURE 2 can serve to locate and secure a pair of male terminal means M as can be seen in views of FIGURES 1 and 2. These rivet means R or other suitable fastening devices can also secure free ends of tab connections T to a condenser or electrolytic capacitor means 30 visible in FIGURES 1 and 2. The capacitor means 30 can include metal foil such as etched aluminum or very thin foil having oxide layering thereon for dielectric purposes as well as for possible tab connection in accordance with a disclosure of a copending application S.N. 615,968—Hancock et al. filed October 15, 1956, now Patent 3,100,933—Hancock et al issued August 20, 1963 and belonging to the assignee of the present invention. It is to be noted that the capacitor means 30 can include wrapped cellulose material such as paper and the like. Also the capacitor means 30 can be impregnated with a suitable electrolyte having a glycol base as is well known. The rib means 12 of the cover 11 serve to position the capacitor means 30 longitudinally within the package 10 and can be seen in views of FIGURES 1 and 2 of the drawings. The rib means 16 engage the upper curved surface of the arcuate mounting plate 26 as can the transverse partitions or web means 17.

Figure 3:
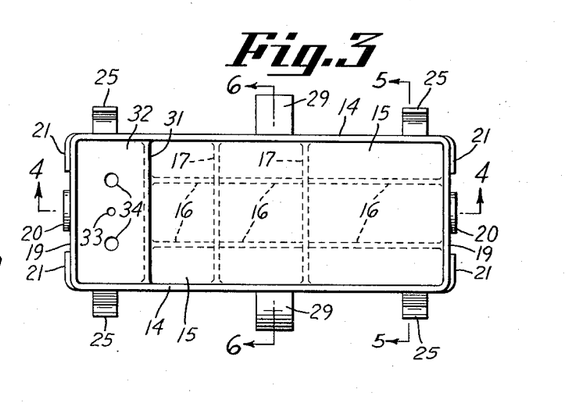
FIGURE 3 is a top view of a body portion of insulating material having features in accordance with the present invention.
Figure 4:
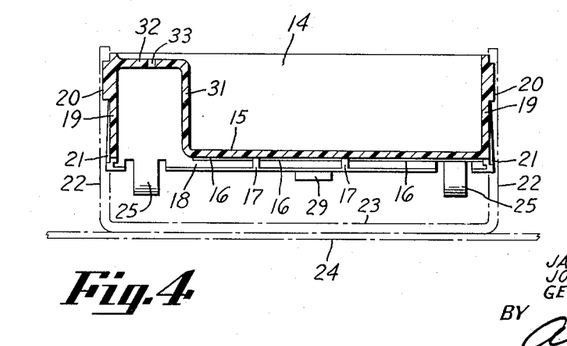
FIGURE 4 is a sectional view taken along line 4—4 in FIGURE 3.
Figure 5:
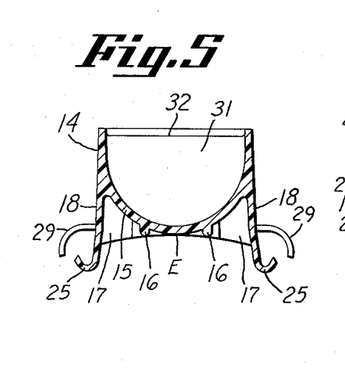
FIGURE 5 is a sectional view taken along line 5—5 in FIGURE 3.

The capacitor means 30 is fitted to space within confines of the body portion 14 and cover portion 11 subject to provision of a ledge formed by an intermediate wall 31 and shelf-like portion 32 provided with a vent or relief opening 33 therein indicated in views of FIGURES 1, 3, and 4. The vent 33 is located intermediate holes 34 through which rivets R are installed. It is to be noted that use of separate washers or sealing rings around the rivets is eliminated in accordance with the present invention due to use of thermoplastic material. Also there is a filling of the space within the package 10 by a curable, expandable, immobilizing material 40 visible in views of FIGURES 1 and 2. This immobilizing material 40 can be internally foamable and though flammable per se, serves to shut off supply of oxygen to interior space such that possible arcing or sparking of the capacitor means due to short circuit therein or due to tab connection can be completely avoided as a danger for fire or inflammation of the package as a whole. The immobilizing agent or material 40 not only fills the dead air space but also acts as a seal for the vent hole 33 which can still operate in the event excess heat softens the foam. Previously, during capacitor operation an explosion could be caused due to an internal arc which could conceivably result in rupturing of the case or housing accompanied by an expulsion of the contents of the electrolytic capacitor means. In accordance with the present invention, the capacitor means 30 is completely encapsulated in a closed cell foam system so as to have no oxygen available in a gaseous state. Therefore, an internal arc could not cause an explosion. Furthermore, arcing is avoided due to the fact that the end wall 19 serves to shield the male and female terminal means adjacent to one end thereof regardless of the type mounting utilized including the U-shaped bracket, arcuate motor housing 26 or flat plate 28. Furthermore, the rivets R inserted through the holes 34 need no separate washers or sealing provision due to the fact that the plastic foam material 40 serves also to seal around the inner ends of the rivets relative to the holes 34. Use of the end wall 19 as a shield for the male and female terminal means assures elimination of a separate end cap as well as separate venting structure of a type disclosed in Patent 2,881,368—Hancock belonging to the assignee of the present invention. Mounting provision of various installations including the U-shaped bracket 23 as well as the arcuate plate or motor housing 26 and flat plate 28 can be provided integrally with the package 10 and there is no need for separate mounting clips on the capacitor means thus representing an improvement over structure of Patent 2,747,827—Georgiev also belonging to the assignee of the present invention. Furthermore, the present invention permits use of materials which may be flammable per se, yet which in combination become non-flammable due to use of the plastic material 40 that encapsulates the capacitor means 30 internally to obviate possible explosions and fires due to cutting off air supply to the interior of the package 10. It is also unnecessary to provide any separable vent plug for use with the electrolytic capacitor means such as disclosed in Patent 2,766,408—Georgiev and Hancock belonging to the assignee of the present invention since the foam plastic material 40 in filling the interior space also serves to close off the vent opening 33 to prevent entry of foreign material yet to permit vent operation as excess heat can soften the foam material.

It is to be understood that the female terminal means F shown in FIGURE 2 can be fitted into a housing of insulating material that can be press-fitted through suitable apertures in the dynamoelectric machine case or housing and therefore sufficient space is provided for accommodating such a mating terminal housing. In effect, the space for the mating terminal means is closed off when used with the arcuate case or housing 26 since the recessed lower edges E are moldable in such a manner that the motor or cabinet wall complementary thereto effects a closure of the space in which the terminal means mate.

The safety capacitor package is self-mounting and the arms 25 can be snap fitted into predetermined apertures of a dynamoelectric machine housing or cabinet engageable by the integrally molded fastening devices or arms 25.

The cover portion 11 and the body portion 14 are heat sealed to each other along a seam 42 indicated in FIGURES 1 and 2. This seam 42 represents a fusion of the plastic material of the cover and body portions due to local application of a heat source which can be in the form of a heating element carried in a suitable tool having a rectangular cutout and transmitting heat to upper edges of the body portion 14 as well as lower edges of the cover portion 11 which is then pressed onto the body portion to result in the fusion of plastic material upon cooling of the plastic material.

The cover portion 11 and body portion 14 can be made of insulating material such as polycarbonate resin, the chemical formulation of which is as follows:

It is to be understood that the center group of each monomer of the copolymer material can be provided with oxygen, nitrogen, or sulfur radicals, etc., in place of that illustrated. A process for making polycarbonates utilizes a bifunctional phenol—bisphenol A which is a basic building block used also in the preparation of epoxy resins. A condensation reaction occurs by splitting out hydrochloric acid to give a linear polymer consisting of bisphenol A groups joined together with carbonate linkages. This example of what is meant by a polycarbonate resin represents only one member of a large family of polycarbonate resins made possible by many opportunities for variation. An isopropylidene group illustrated in the foregoing chemical formulation may be modified or it may be entirely replaced by radicals of carbon, oxygen, nitrogen, sulfur, silicon and others. Substitutions on the benzene ring offer further possibilities for variations and up to one hundred different resins belonging to the polycarbonate family can be produced. Polycarbonate resin provides an exceptionally high impact strength in a range of 12–16 ft. lbs. per inch of notch as proven by a notched Izod impact-strength test. Water absorption is only slight at three-tenths of one percent and the polycarbonate resin offers superior heat resistance to thermal-oxidative degradation up to 300° F. A high heat distortion point of 280°–290° F. assures thermal stability particularly useful for installations where high healing due to ambient conditions can occur. There is dimensional stability particularly with respect to humidity and moisture conditions. When exposed to 50% relative humidity at room temperature for example, polycarbonate resin materials reach an equilibrium at 0.15% water absorption. Further as to dimensional stability, tests have been conducted under conditions of aging for ninety days at 125° C., and a sample part of polycarbonate resin material showed a dimensional change of only one mil per inch.

Dielectric strength of polycarbonate resin material for one-eighth inch thickness, for example, is substantially four hundred volts per mil. Dielectric constant for sixty cycle power is 3.17 and for $10^6$ cycles is 2.96. Power factor for sixty cycles is 0.309 and for $10^6$ cycles is 0.010.

As to chemical stability, the polycarbonate resin is insoluble in solvents such as petroleum ether, hexane, ethanol and water. It is also stable in the presence of dilute aqueous acids, aqueous salt solutions and various oils. Polycarbonate resin material is only partially soluble in aromatic hydrocarbons, benzene and toluene, and in acetone, ethyl acetate and nitro benzene. The polycarbonate resin material can be injection molded using commercial presses ranging from one ounce to sixteen ounce capacity with cylinder temperatures on the order of 500°–575° F. and pressures from 10–30,000 p.s.i. have been used. The compression ratio is 1.74 and the mold shrinkage is 0.005–0.007 inch per inch. Even cold molds have been used, but generally heated molds from 170° to 200° F. are required for satisfactory injection molding. The coefficient of linear thermal expansion of the polycarbonate resin material is $7 \times 10^5$ in./in. ° C. Thermal conductivity of the polycarbonate resin material is $46 \times 10^4$ cal./sec./cm.$^2$/° C./cm.

It is to be understood that other plastic material such as long chain synthetic polyamides having recurring amide groups as an integral part of the polymer chain can also be used for the plastic cover portion 11 and body portion 14 of the package 10. In any event, the heating peripherally of the contiguous edges of the cover and body portions can provide a hot seal of the cover to the housing. Simultaneously with the hot sealing of the cover to the housing, it is possible to accomplish foam formation internally of the package. Immediately prior to heating around the peripheral edges of the cover and body portions, a predetermined quantity of prepolymer material can be squirted in liquid form onto the capacitor means 30 fitted into the space provided by the body portion 14. This prepolymer for foam formulation should have a low initial viscosity with a relatively rapid reaction and gelation rate. The foaming mass should have the ability to flow while maintaining its stability. High viscosity impedes escape of gas and liquid drainage though initial prepolymer viscosity per se does not necessarily determine formation of a suitable foam. Good resilient urethane foams can be made from prepolymers having initial viscosities ranging from 1500 to 80,000 cps. Stability of resilient urethane foams is, in part, dependent upon the rate at which the viscosity of the foaming mass builds up. This rate of viscosity build up due to chain extension and cross linking can vary depending on the rate of reaction and the initial prepolymer viscosity. The amount of material placed into the cavity occupied by the capacitor means 30 must be limited since a volume expansion in the order of up to thirty times initial volume occurs during foaming.

The foam material 40 which fills the space within the package 10 serves as an immobilizing agent for the capacitor means and also as a vent as well as a seal and cutoff for oxygen supply. Glass wool could be used for damping and wax could also fill the space within the package 10 though use of urethane polymers is particularly advantageous with the polycarbonate resin cover portion 11 and body portion 14. Tar compounds cannot be used because phenolic would attack the cover and body portions so as to be undesirable. Use of the polyurethane foam material 40 is advantageous because during formation of such foam carbon dioxide gas is formed which serves to smother possible fire by obviating oxygen supply thereto. Excessive vibration and shaking on a motor mounting, for example, could result in breaking loose a capacitor from tar compounds, but with the urethane foam material there is a bonding and positive adhesion of the foam to the glycol-based electrolytic impregnate such that the capacitor means is held in place firmly though no separate vent plug is needed and only a hole or vent aperture 33 is provided for filling of the inner cavity with foam subject to use of the foam and the vent passage 33 for vent operation without any separate cap or plug.

The polyurethanes are polymers possessing urethane structure as follows:

These polymers are prepared by action of diisocyanates R (NCO)$_2$ on glycols, triols and polyhydroxy compounds. The symbol "R" represents an anonymous organic group composed of atoms of carbon and hydrogen and such a group is known as a radical. Tolylene diisocyanate is a popular starting material for polyurethane sold commercially. Glycols, polyesters and polyethers when mixed with tolylene diisocyanate, react to form long-chain polymers having a general structure as follows:

These materials are used extensively as foamed plastics. They are readily converted into three-dimensional networks and, by leaving a trace of diisocyanate in the resin mix, water can be made to react with it and cause expansion.

The resultant safety capacitor package 10, in effect, becomes an integral piece due to foam formation internally thereof which fills the unit hermetically and shields as well as encapsulates the capacitor means 30. The ends 19 together with the sides 18 help to close off the mating terminal means in shielded relationship though the integral mounting arms or lugs provided on the body portion 14 permit direct mounting to flat or rounded surfaces. As indicated earlier, if a flat mounting surface is used, it is possible to have the insulated conductors brought out laterally below the curved recess or edge E of one end. The integral mounting arms or legs 25 are sufficiently flexible to permit spreading thereof and to permit pinching together for installation and release on flat as well as rounded mounting surfaces subject to use of a probe or tool if necessary. Provision of the opposite end projections 20 makes the safety capacitor package completely interchangeable as a unit with previous capacitor structures even if mounted relative to a U-shaped bracket means 23. Thus, the subject safety capacitor package 10 will fit any mounting presently known and used as a standard in industry.

Polyurethane as a plastic end polymer has a high electric strength and a useful temperature range of 150° C. for rigid polymers. The end polymer results from condensation as a mechanism of polymerization using such starting monomers as diisocyanates and glycols, often polymeric. A nominal density of substantially ten pounds per cubic foot has been found suitable providing a compressive strength of 197 p.s.i. at 50% deformation and a compressive modulus of 3100 p.s.i. Tensile strength is approximately 155 p.s.i. and flexural strength is 275 p.s.i. A shear strength of 78 and a thermal conductivity of 0.24 B.t.u./ft.$^2$/hr./° F./in. is obtained. Adhesion to most surfaces is good with bond strengths approaching tensile strength of the foam itself. Polyurethane foam also bonds perfectly to itself. It is also possible to provide a post-foaming cure in an oven by infrared radiation or through heaters to assist cross linking of molecules. Even a room temperature cure alone can be used though the heat applied for sealing of the cover and body portions to each other can be up to 1,000° F. down to approximately 600° F. Use of a relatively dense polyurethane foam provides for improved dissipation of heat from the capacitor means 30 and more effectively, shuts off oxygen supply to space within the package thus enhancing the non-flammable condition of the combination of materials which were flammable per se.

It is to be understood that use of the plastic insulating material for the cover and body portions together with the isocyanate or urethane foam packing therein achieves an insulating mounting exclusively for the capacitor means except for metal electrical connections thereto. In effect, there is thus an all-plastic housing and encapsulation mounting for the capacitor means. Polyisocyanates, specifically, the diisocyanates for insulation purposes are commercially advantageous.

In the way of further background information, it is noted that a monomer is merely an unpolymerized form of a compound. A polymer has the same elements in the same proportions by weight as the monomer, but its molecular weight is greater with differing properties. Polyesters and a number of other well-known polymers can be built up from monomers by a reaction which involves a formulation of water or alcohol which, in turn, restricts or practically limits feasibility of multiplication of molecular weights. To produce an isocyanate-based polymer, an isocyanate group is reacted with a molecule having a reactive hydrogen atom. Since the products of original reactions can have more replaceable hydrogen atoms bonded to nitrogen atoms, further reactions with isocyanates can continue to occur even though more slowly. A fire retardant can be added to rigid urethane foam which is self-extinguishing once a flame is removed. Reference can be made to Patent 2,877,192 as well as 2,877,193 and 2,879,233 concerning further details as to polyurethane materials. The glycols of the electrolyte (ethylene glycol) and polyurethane foam material (polyglycol base) are compatible though too much glycol could cause deterioration of the foam. The polycarbonate case material and foam encapsulation of the capacitor means can result in a package competitively priced even to replace well-known Bakelite and phenoformaldehyde materials. It is possible also to use polypropylene because there is nothing which can ignite or catch fire internally by use of the curable foam material to encapsulate the capacitor means 30. The foam material, as indicated earlier, aids also in sealing around the rivets R forming a bond to the metal of the rivets as well as to the plastic body portion surrounding the rivet holes 34. Polyether as well as polyester type of carbon dioxide blown polyurethane foam is advantageously used in the motor mountable safety capacitor package 10 in accordance with the present invention. The foam material provides a semi-rigid support for the capacitor means which is prevented from breaking loose due to the bond of the glycol materials common to the foam material and electrolytic impregnating material. Shrinkage of the foam material can be avoided by careful control of prepolymer preparation and suitable adjustments of the foam recipe. Shrinkage can be avoided by foaming a suitable recipe under dry or moist carbon dioxide. The isocyanate-water reaction is strongly exothermic and causes a temperature rise during foaming. As the foam cools back to room temperature, a gas contained therein contracts. However, such gas contraction will not result in substantial shrinkage if the curing reaction is very rapid compared to the rate of gas permeation. Carbon dioxide diffuses out of newly prepared polyurethane foams much more rapidly than air diffuses into them. The resulting pressure differential can cause shrinkage but if the curing reaction is rapid compared to gas diffusion or if the foam structure opens up before enough pressure differential has built up, no shrinkage occurs. The carbon dioxide provides good heat conductivity and the high density foam material also enhances dissipation of heat. This is an advantage so far as a capacitor means 30 is concerned. The combination of the foam material with the plastic cover and body portion is non-flammable because air supply is cut off and thus danger of a fire which could produce hydrochloric acid that damages foil of a capacitor means is obviated. A hermetically sealed unit readily mountable is provided in a strong housing for solid support of the capacitor means 30. The foam results from squirting material in liquid form into the housing subject to heating peripherally for sealing the cover hermetically to the body portion while simultaneously causing foam to expand to the air vent which becomes closed off by the foam. Use of a non-halogenated blowing agent is noted to avoid liberation of chlorides from plastics such as chlorine or fluorine type materials including tetrafluoroethylene.

It is to be understood that the cover and body portions can be sealable to each other not only by heat fusion but also by use of solvents, adhesives or chemically through epoxy materials and the like. Thus, mechanical fusion as well as chemical adhesion can provide the fusing juncture between the cover and body portions. Also, it is to be understood that the foam does not necessarily provide total or 100% encapsulation and filling of space between the capacitor and housing since there is a possibility that minor air pockets can be left once the foaming action is permitted to occur. In any event, the capacitor means are protected from air by a combination of factors including the foaming seal as well as the electrolyte impregnating material and the case. Also it should be noted that the foam forming prepolymer can be injected through a vent opening such as 33 in the body portion at a time subsequent to fusion of the cover and body portion to each other. The prepolymer can be squirted or injected in a liquid condition through such a vent opening subject to formation of the encapsulating foam subsequent to enclosure of the capacitor means within the housing. Thus, the foaming can occur simultaneously with the sealing of the cover to the body portion or at any subsequent time since the foam prepolymer in liquid form can also be added after assembly and sealing. Upon subsequent injection of the foam prepolymer through the vent hole, it is possible for foam expansion to occur due to heating and possibly subsequent foam filling can assure more proper foaming since heat can be uniformly applied and is not necessarily supplied temporarily and removed during heat sealing. Also in the event adhesive sealing and the like is used for fusion of the cover to the body portion, it may be advisable to permit a secure bond therebetween and subsequent heat application for foaming purposes can be provided. It is to be understood that the weight of foam can be in a range between one and one-half pounds per cubic foot to thirty pounds per cubic foot and sometimes up to fifty pounds per cubic foot. Thus, the specific example of a ten pound per cubic foot foam as advantageous should not be taken as a limitation. In any event, it is to be understood that use of carbon dioxide or non-halogenated blown foam improves, so far as heat dissipation is concerned, over Freon or halogenated blown foam which is generally for heat insulation. Thus, the high density foam is better for heat dissipation purposes and the foam is distinguishable from materials provided for retaining, containing or hindering transfer of heat in one direction or another.

Reference to a moldable plastic material for the cover and body portion can include use of thermal plastic for purposes of heat sealing along the juncture therebetween and use of thermal setting plastic materials which are acceptable as adhesives such as epoxy and the like are used for sealing. Reference to polycarbonate material is not to be taken as a restriction since for some insulating polyamide or nylon material could be acceptable though there can be a difference in the heat sealing characteristics. Nylon materials generally are more difficult to heat seal but recently a non-burning nylon easier to heat seal has become available and can be used for the cover and body portions. It is also possible to use fire retardant polypropylene material even though this polypropylene is burnable per se. However, use of polypropylene though burnable per se would be acceptable, namely for mounting of a capacitor package relative to other than a motor means which can get hot where polypropylene can lose its characteristics. The polypropylene can be acceptable for cabinet mounting and the like, particularly where a reduction in cost of the plastic material is sought by a customer who does not intend to use the subject capacitor package in a high temperature or heated environment. There is a possibility that electrolytic material within the capacitor package might dissolve some of the foam material which then no longer serves as a fire retardant per se though the foam is not necessarily to provide a complete filling of space but rather, to assure a sealing of the capacitor means from air in combination with the plastic housing therewith as noted earlier. Thus, it is to be understood that there is a precluding of entry of all oxygen since there may be pockets of gaseous material left within the housing though these pockets would be isolated from the capacitor means or at least entrapped so as to obviate possible continuous supply of oxygen which would support combustion which is to be avoided. In fact, the capacitor means becomes part of an integral package wherein the enclosure itself provides the mounting and it is possible to use plastic material such as polycarbonate and nylon, for example, as a support of a current carrying part including foam which also supports the capacitor means so long as not overheated within a case or housing that does not support combustion and at least is made of a material which is self-extinguishing so far as possible fire is concerned. It is to be noted that the terminal connections are effective for electrical energization with or without foam materal in the capacitor package and the package having the capacitor per se enclosed therein provides mounting lugs and avoids use of a combination of three separate parts such as capacitor, housing and bracket means as outlined in FIGURE 4. However, the capacitor package in accordance with the present invention is compatible for use with such bracket means where installations are already provided therewith and thus no other mounting has to be installed. Reference was made earlier to the fact that tar could be disadvantageous in a capacitor package and this has reference to the fact that tar will hurt a material such as polycarbonate plastic. It is to be understood that the housing can be made of polycarbonate with polyurethane foam being used adjacent to the polycarbonate material of the housing yet having tar immediately adjacent to the capacitor means and separated from the housing by the polyurethane foam without any deleterious effects. Use of thermal plastic as a support for current carrying parts has previously been considered but avoided because of safety regulations, but in the present capacitor package, it is possible to provide such a support for current carrying members because the assembly can form an integral unit in which fire is avoided due to shutting off air supply and thus an advance is made for further use of plastic materials.

Figure 8:
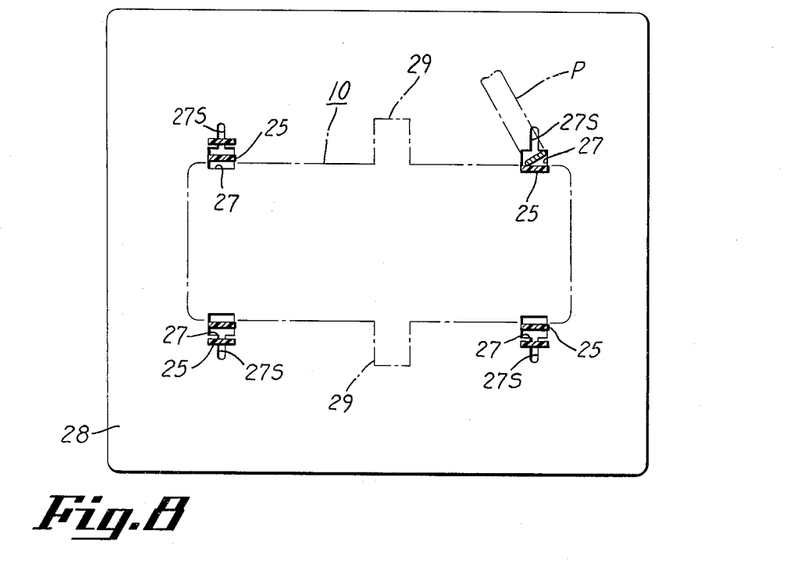
Figure 9:
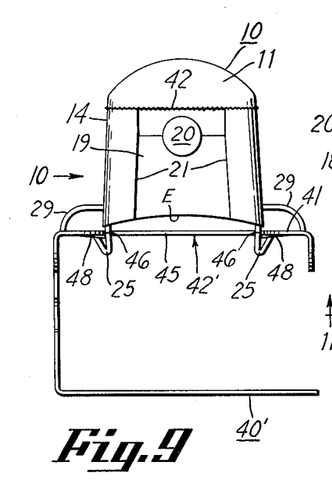
FIGURES 9 and 10 are end and side views, respectively, of another mounting of the same capacitor package.
Figure 10:
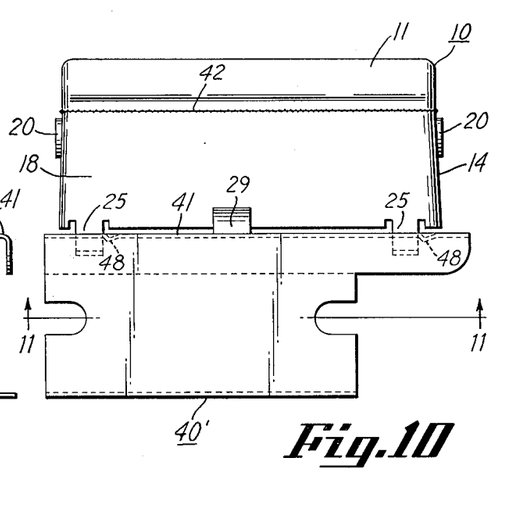
Figures 11, 12:
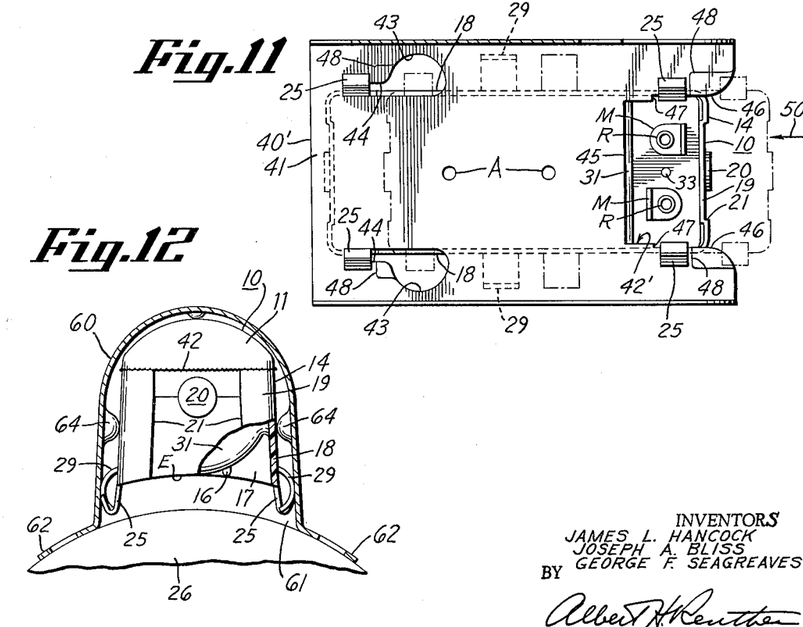
FIGURE 11 is a sectional view along line 11—11 in FIGURE 10.
FIGURE 12 is an end view of a further mounting of the same capacitor package.

Use of the curved as well as the flat mounting panels as well as the U-shaped bracket has been noted earlier. For service installations such multiple mountings can be quite advantageous and it is to be noted that the subject capacitor package including the projections 20 can be snapped tightly in place from the top or bottom as to the U-shaped bracket, for example. Further mountings possible with the capacitor package in accordance with the present invention can be seen in views of FIGURES 9 through 11 as well as FIGURE 12 of the drawings. In some capacitor package installations there may be limited space for access to a capacitor mounting and then a press and snap fit of the mounting lugs to apertures may be more difficult, particularly if access to the apertures is desired for servicing purposes. For instance, use of a tool such as a probe, ice pick or screwdriver as indicated in the view of FIGURE 8 may be acceptable on a motor means mounting particularly where the screwdriver or probe can be inserted into apertures or lateral slots 27s indicated in FIGURE 8 for positioning the free ends of the lugs to one side without space limitation. However, within an appliance, space may be quite limited and reference can be made to a disclosure of a copending application Serial No. 154,461—Seagreaves filed November 24, 1961 disclosing a refrigeration relay box and condenser assembly in which an appliance cabinet would limit access to the capacitor package. In such instances, a substantially U-shaped bracket generally indicated by numeral 40' in FIGURES 9, 10 and 11 can be provided for a slide fit of the capacitor package 10 visible in these views. It is apparent that the same mounting lugs 25 and stabilizing arms 29 can be used to advantage on this bracket which includes a top flat plate portion 41 having an inwardly recessed and/or cutout 42' as well as a pair of bayonet-like or keyhole-shaped openings 43 which include a semi-arcuate portion as well as a slot portion 44 of reduced width as can be best seen in the view of FIGURE 11. The recess 42' can terminate in a suitable location laterally inwardly from an end of the plate portion 41 along an edge 45 to one side of apertures A which can be provided centrally of the plate portion 41. These apertures A can be for the purpose of installing a fastening device or screw for holding a U-shaped clip such as 22–23 if an older type of capacitor container is to be mounted on this mounting. However, the capacitor package 10 can be installed on differing mountings including also the plate portion 41 by insertion of at least a pair of mounting lugs 25 as indicated in FIGURE 11 through the keyhole-like openings 43 and optionally there can even be a pivoting of the housing due to initial location of the lugs 25 to openings 43 due to sliding of a remaining pair of lugs 25 along guide edges 46 of the recess 42' against a pair of shoulders 47 visible in FIGURE 11. It is to be understood that two pairs of the keyhole-like openings 43 can also be provided though for use of female terminals to fit the male terminal connections M visible in FIGURE 11, the provision of recess 42' is more advantageous. Bumps or deformed portions 48 indicated in the views of FIGURES 10 and 11 can be provided in a location intermediate the keyhole-like openings 43 and slot extensions 44 as well as extending laterally outwardly from the guide edges 46 so that an interlocking snap fit of the free ends of the mounting lugs 25 can occur relative to the mounting plate portion 41. An arrow 50 in FIGURE 11 represents sliding movement from an initial positioning of the capacitor package 10 to a finally installed position. Use of the sliding insertion provides a snug mounting and the bump portions avoid shaking loose or inadvertent disengagement of the capacitor package from the plate portion 41. There is, in effect, a tensing of the capacitor package as mounted on the plate portion and held resiliently by the mounting lugs 25 as well as the stabilizing arms 29. Similar avoidance of shaking and resilient support is provided with the curved plate 26 of FIGURE 1 as well as the flat plate mounting of FIGURES 7 and 8 of the drawings. The use of sliding mounting avoids any need for a tool such as a screwdriver and the like since a bayonet-type insertion through at least a pair of apertures or openings 43 permits pivoting and sliding of the capaictor package 10 into an anchored position. The open end recess 42' makes it possible to fit male and female terminal means to each other prior to mounting assembly and also facilitates replacement of the capacitor package if necessary in an appliance or refrigeration cabinet where space is limited.

A fifth possible mounting is illustrated in FIGURE 12 wherein a box-like case 60 having oppositely closed ends and an open bottom 61 can be fitted around the capacitor package 10. The case 60 can include a pair of opposite laterally outwardly extending mounting flanges 62 which can have apertures therein to receive fasteners or screws for mounting on a motor housing. The case 60 can have a pair of integral inwardly extending projections 64 which slideably engage an outer periphery of the body portion 14 while simultaneously the stabilizing arms 29 are forced laterally inwardly though still resilient into engagement with an inner periphery of the case 60. The mounting lugs 25 also serve a purpose supplementing the engagement of the projections 29 by also engaging the inner periphery of the case 60. It is apparent that the mounting lugs 25 and stablizing arms 29 as well as the inward projections 64 provide firm and resilient support for the capacitor package 10 within the casing 60 such that the package need not be altered in any way though it can still be used with any of the other types of mountings. The case 60 can be referred to as a "doghouse" and the capacitor package 10 is completely compatible therewith and there is no need for removing the mounting lugs 25 or stabilizing arms 29 which actually help in maintaining a tight though resilient support while avoiding any shaking or vibration between the package and case. It is to be noted that the keyhole-like openings 43–44 and recess 42' with the shoulders 47 can be provided to accommodate varying thicknesses of material of either the plate portion 41 or mounting lugs 25 due to resilience of the free ends of the mounting lugs to accommodate a slide fit. In some instances a taper can be provided on one side of the bump portions 48 if desired.

It is to be noted that the foamable material within the capacitor package can not only cut off air supply to avoid possible fires but also provides an insulating media around wiring accompanied by an increase in the coefficient of linear expansion regardless of heat conditions of the package generally. Also, since the terminal connections can be foamed around at least one side thereof, the foam with its coefficient of expansion can accommodate any difference in rates of expansion between the metal of the wiring and/or terminal connections relative to the plastic body portion forming part of the compact capacitor package.

While the embodiments of the invention as herein disclosed constitute preferred forms, it is to be understood that other forms might be adopted.

What is claimed is as follows:

1. A plastic non-fiammable capacitor housing comprising, a body portion and a cover portion, said body and cover portions having complementary peripheral engaging surfaces being hermetically sealed together along said engaging surfaces to form an interior housing space for containing a capacitor means, said body portion including a plurality of integral mounting lugs extending therefrom for securing said housing to a support, and one of said portions including a vent passage to provide an opening to the interior of said housing.

2. The plastic capacitor housing of claim 1 wherein said cover portion, body portion and mounting lugs are made of polycarbonate resinous material, said mounting lugs include a substantially J-shaped configuration, and said housing includes oppositely extending projections at each end thereof for attaching said housing to a housing end support means.

3. The plastic capacitor housing of claim 1 wherein said body portion includes a rounded bottom interior surface and said cover portion includes an upper interior surface having longitudinally extending ribs whereby said interior surfaces provide means to support a cylindrical capacitor means, said body portion includes side skirts extending downwardly from the top thereof and terminating in a bottom edge to form exterior body portion side surfaces being integral with said mounting lugs, and said body portion further includes exterior end walls terminating in a recessed bottom edge.

4. The plastic capacitor housing of claim 1 wherein said body portion includes a curved bottom interior surface for supporting an annular capacitor means, and the bottom exterior of said body portion includes crossed transverse and longitudinal ribs to provide increased strength, said body portion further includes side skirts and end walls, said body portion side skirts extending downwardly from the top thereof terminating in side bottom edges to form exterior body portion side surfaces, and each of said end walls terminate in an upwardly curved recessed bottom edge, said body portion end walls each having a pair of bottom flanges wherein each flange extends along the bottom edge of said end wall a predetermined distance from a corner formed by said body sides and end walls.

5. The plastic capacitor housing of claim 1 wherein said body portion includes side skirts extending downwardly from the top thereof to form body portion side surfaces having integral therewith laterally extending resilient stabilizer arms projecting from said body sides and cooperating with said mounting lugs to mount said housing to a surface, and said body portion further includes end walls each having annular projections extending therefrom for engagement with a housing end support means.

6. In a combination for the non-flammable mounting of a capacitor, a plastic capacitor housing comprising a body portion and a curved cover portion, said body and curved cover portions having complementary peripheral engaging surfaces being sealed together along said engaging surfaces to form an interior capacitor housing space, one of said body and curved cover portions including a vent passage to provide an opening to the interior of said housing, one of said portions including an electrical connector means, an electrolytically impregnated capacitor means being positioned within the interior of said capacitor housing, said capacitor means having tab terminals connected to said connector means, and a foamed, expanded and cured immobilizing material of predetermined cellular density substantially filling the housing interior space between said housing and said capacitor means to resiliently encapsulate and support said capacitor means having tab terminals whereby said immobilizing material restrains movement of said capacitor means within said housing and also covers said vent passage opening to limit dust and dirt particles passing into said housing.

7. The combination of claim 6 wherein said body portion includes integral mounting lugs, said mounting lugs extending downwardly from said body portion and terminating in an upturned hook portion, and said combination also includes a slotted support plate means having plural slots being substantially key-hole shaped and cooperatively arranged to correspond to said housing mounting lugs to provide means for receiving said mounting lugs into a locking engagement with said slotted support plate means.

8. The combination of claim 6 wherein said electrolytically impregnated capacitor means includes an electrolytic impregnation material of a glycol-based composition and said immobilizing material is of a predetermined cellular density and includes a glycol constituent to bond said material with said capacitor means.

9. The combination of claim 8 wherein said plastic capacitor housing includes plural mounting lug means being integral with said body portion, said lug means including a pair of projections with each of said projections extending from an opposite end of said body portion along a common axial axis and the remainder of said mounting lug means being resilient and extending downwardly from said body portion and including J-shaped lug portions, and said combination also includes a housing support means including a U-shaped clip having means to engage said pair of projections thereby supporting said housing by said projections.

10. The combination of claim 8 wherein said plastic capacitor housing includes plural mounting lug means being integral with said body portion, said lug means including a pair of projections with each of said projections extending from an opposite end of said body portion along a common axial axis and the remainder of said mounting lug means being resilient and extending downwardly from said body portion and including J-shaped lug portions, and said combination also includes a housing support means including a panel having apertures complementally spaced to receive the downwardly extending J-shaped mounting lug means.

11. The combination of claim 8 wherein said plastic capacitor housing includes plural mounting lug means being integral with said body portion, said lug means including a pair of projections with each of said projections extending from an opposite end of said body portion along a common axial axis and the remainder of said mounting lug means being resilient and extending downwardly from said body portion and including J-shaped lug portions, said combination also includes a housing enclosure means engageable with a support surface and providing means to receive said all plastic housing means so that said housing enclosure surrounds an exterior portion of said all plastic housing means and said remainder of said mounting lug means resiliently engage internal surfaces of said enclosure thereby retaining said housing in said enclosure means when the housing is mounted therein.

12. The combination of claim 6 wherein said capacitor tab terminals and said connector means are internally sealed within the interior of said body portion by said immobilizing material of predetermined cellular density.

13. The combination of claim 6 wherein said immobilizing material is a polyurethane foamed plastic completely filling the interior space of said housing containing said capacitor means thereby covering the interior portion of said vent passage to prevent entry of combustible particles through said vent and to encapsulate said capacitor means and the electrical connections within said housing including said tab terminals and said connector means, whereby said encapsulating material forms a closed cell foamed system to reduce air passing through said vent and about said capacitor means thereby reducing internal arcing and explosive conditions about said capacitor means.

14. In combination, an electrolytically impregnated capacitor means having tab terminals and connector means for applying electrical energization thereto, mounting means for said capacitor means including a non-flammable plastic housing, a support means for said mounting means, connector means fixed to said housing for applying electrical energization to said capacitor means, said non-flammable plastic housing having a body portion and a cover portion, said body and cover portions including complementary peripheral engaging surfaces wherein said engaging surfaces are sealed together by heat fusion with said electrolytic impregnated capacitor being mounted within said housing, said body portion including multiple mounting projections integral therewith and extending from said body portion for engagement with said support means, said body portion also being provided with a vent passage to provide an opening to the interior of said housing, and a foamed material filling the interior space of said housing and covering the interior portion of said vent passage provided in said body portion and also encapsulating said tab terminals and connector means within said housing.

15. The combination of claim 14 wherein said multiple mounting projections include substantially J-shaped arms, said support means includes a flat plate having apertures therein cooperatively arranged for receiving said J-shaped arms and to permit engagement of said arms with said flat plate support means, and said body portion includes an end wall having a recessed opening to permit electrical conductors to pass between said end wall and said flat plate support means when said housing is mounted thereon and the conductors are connected with said connector means and said tab terminal of said electrolytically impregnated capacitor means.

16. The combination of claim 14 wherein said multiple mounting projections include substantially J-shaped arms integral with said body portion, said support means includes a curved plate, said curved plate supporting means having apertures complementary to said J-shaped arms for receiving said arms and including means for releasing said J-shaped arms upon application of a tool through said apertures, and said body portion includes opposite end walls extending downwardly and terminating in an arcuate bottom edge having a complementary contour to the contour of said curved plate supporting means whereby said bottom arcuate edge is engageable with said curved plate supporting means when said housing is mounted thereon.

17. The combination of claim 14 wherein said multiple mounting projections include a pair of lugs, each lug extending from an opposite surface of said body portion along a common axis, said support means includes a clip support means for supporting said housing at said lugs and the other of said multiple mounting projections are resilient.

18. The combination of claim 14 wherein said foamed material is of polyurethane plastic with a non-halogenated blowing agent to further reduce the possibility of fire.

19. In combination, an electrolytically impregnated wrapped foil capacitor means, and an all plastic capacitor housing having said capacitor means mounted therein, said capacitor housing including an arcuate shaped cover portion having longitudinally extending rib means projecting inwardly from the interior cover surface and engaging said electrolytically impregnated capacitor means, said cover and body portions having a complementary peripheral engaging surface and being joined together by fusion along said engaging surfaces, said body portion having integral mounting projections projecting therefrom to mount said housing to a support means including a U-shaped clip means engageable with at least two of said integral mounting projections and the other of said mounting projections engageable with a support plate having means for receiving said other mounting projections to mount said housing to said support plate.

References Cited by the Examiner
UNITED STATES PATENTS

| | | | |
|---|---|---|---|
| 2,460,903 | 2/49 | Peck | 317—230 |
| 2,465,722 | 3/49 | Hamilton | 219—19 |
| 2,891,103 | 6/59 | Swengel | 174—153 |
| 2,943,758 | 7/60 | Harris | 220—4 |
| 2,999,222 | 9/61 | Adams | 174—52 |

JOHN F. BURNS, *Primary Examiner.*

JOHN P. WILDMAN, *Examiner.*